(12) United States Patent
Di Stefano et al.

(10) Patent No.: US 12,474,379 B2
(45) Date of Patent: Nov. 18, 2025

(54) ARC-FAULT DETECTION APPARATUS AND METHOD AND ELECTRICAL INSTALLATION

(71) Applicant: Prysmian S.p.A., Milan (IT)

(72) Inventors: Antonio Di Stefano, Palermo (IT); Aurelio Zinno, Palermo (IT); Giovanni Artale, Palermo (IT); Nicola Panzavecchia, Palermo (IT)

(73) Assignee: Prysmian S.p.A., Milan (IT)

( * ) Notice: Subject to any disclaimer, the term of this patent is extended or adjusted under 35 U.S.C. 154(b) by 231 days.

(21) Appl. No.: 18/471,848

(22) Filed: Sep. 21, 2023

(65) Prior Publication Data

US 2024/0110955 A1 Apr. 4, 2024

(30) Foreign Application Priority Data

Sep. 22, 2022 (IT) .................. 102022000019407

(51) Int. Cl.
*G01R 19/165* (2006.01)
*G01R 31/58* (2020.01)

(52) U.S. Cl.
CPC ....... *G01R 19/16528* (2013.01); *G01R 31/58* (2020.01)

(58) Field of Classification Search
CPC .. G01R 19/16528; G01R 31/58; H02H 3/006; H02H 3/44; H02H 1/0015
See application file for complete search history.

(56) References Cited

U.S. PATENT DOCUMENTS

| | | | |
|---|---|---|---|
| 5,434,509 A * | 7/1995 | Blades | G01R 31/66 324/613 |
| 5,839,092 A | 11/1998 | Erger et al. | |
| 6,590,754 B1 | 7/2003 | Macbeth | |
| 9,869,709 B2 | 1/2018 | Belhaja et al. | |
| 2006/0227469 A1 | 10/2006 | Parker et al. | |
| 2013/0128396 A1 | 5/2013 | Danesh et al. | |
| 2020/0127452 A1* | 4/2020 | Haines | H02H 3/44 |

FOREIGN PATENT DOCUMENTS

| | | |
|---|---|---|
| CN | 107134777 A | 9/2017 |
| IT | 201800002111 A1 | 7/2019 |

\* cited by examiner

*Primary Examiner* — Feba Pothen
(74) *Attorney, Agent, or Firm* — Slater Matsil, LLP

(57) ABSTRACT

An example arc-fault detection apparatus includes an electrical current measuring device connectable to an electrical circuit and configured to provide a measured signal representing an electrical current flowing in the electrical circuit. A computing device is configured to: acquire a first plurality from samples of the measured signal included into a first time interval and a second plurality of sample from the measured signal included into a second time interval, subsequent to the first time interval; perform a discrete derivative of the first plurality of samples obtaining past derivative samples and a discrete derivative of the second plurality of samples obtaining present derivative samples; compute a derivative similarity index by processing the past derivative samples and the present derivative samples according to an auto-correlation type function quantifying the similarity of the past derivative samples with the present derivative samples.

20 Claims, 11 Drawing Sheets

ARC-FAULT DETECTION APPARATUS AND METHOD AND ELECTRICAL INSTALLATION

CROSS-REFERENCE TO RELATED APPLICATIONS

This application claims priority to Italian Application No. 102022000019407, filed on Sep. 22, 2022, which application is hereby incorporated herein by reference.

TECHNICAL FIELD

The present disclosure relates to arc-fault detection in electrical installations.

BACKGROUND

Arc-fault is a type of electrical fault occurring in wiring systems when a solid electrical connection becomes defective (i.e. lose, intermittent, etc.). Such defects can be due to age and deterioration of contacts or wires which is frequently brought on by external or environmental factors as harsh environment, animals, etc. In this condition, when a current flows an arc may be generated though a partially conductive medium (gas, liquid, etc.) under the effect of the voltage.

This effect brings a rapid increase of the temperature of conductor, insulator, and surrounding materials. Because it can easily create fires and endanger lives, this problem is especially harmful in-home wiring systems (as well as in other delicate settings, like aircraft, marine, trains and medical environment). Since the arc is caused by the current flowing into the wire, it may affect even very low voltage systems, whether they are AC or DC. According to the United States Fire Administration (USFA), more than 67800 fires in 2006 had an electrical origin. Also, according to USFA, between 2011 and 2015 about 28.3% of the 375,840 fires in buildings had such an origin.

The above-described arc faults, also known as "series arc faults," are incapable of being detected by the typical mandatory protection devices present in common wiring systems, such as Residual Current Breaking with Overcurrent (RCBO) switches, which are only tripped by the overall residual (differential) current or by an overload. For these reasons, several nations require the installation of arc fault detectors in addition to the regular protection devices.

Particularly, arc-faults can be generated between two consecutive points of the same conductor. This condition is very difficult to be detected because it does not generate macroscopic changes in electrical parameters (such as average drawn current, voltage drop, differential current, etc.), but only small and stochastic deformations in the current waveform and, to a lesser extent in the voltage. Moreover, many common electrical loads normally generate internal arcs or waveform deformations during their operations (such as brush motors used in drills, vacuum cleaners, etc.). It makes much harder to discriminate between an actual arc and the normal operation of these loads, also called "masking loads".

For that reasons, known are fault detection algorithms are complex, involving an analysis of the current and/or voltage waveforms in order to extract some waveform features and a specific discrimination strategy. These investigations are typically fairly complex, thus using specialized equipment with reasonably high computational capacity is necessary to obtain a trustworthy detection. According to some known techniques, these algorithms are based on neural networks or more advanced techniques like harmonic analysis.

Document U.S. Pat. No. 9,869,709-B2 describes an electric arc detection method where an electrical current is filtered by three different filters centered at different frequencies; moreover distance quantities are determined between the filtered signals exiting the same filter at different time windows; when one of these correlation is high enough the presence of an electric arc is detected.

Document IT201800002111 describes an electric arc detection method evaluating the second derivative of the current between various time frames and counting the number of picks of the second derivative

SUMMARY

The Applicant has noticed that the techniques of the prior art are computationally onerous, requiring significant processing power so as to be hardly implementable in existing protection or monitoring devices.

The Applicant has found that a degree of similarity of the derivative of the electrical current flowing into a circuit, evaluated by employing an auto-correlation type function (taking into account derivative samples in two or more time intervals), can be employed to efficiently detect the presence of arc-faults.

According to a first aspect, the present disclosure relates to an arc-fault detection apparatus comprising an electrical current measuring device connectable to an electrical circuit and configured to provide a measured signal representing an electrical current flowing in the electrical circuit. A computing device is configured to acquire a first plurality of samples from the measured signal included into a first time interval; acquire a second plurality of sample from the measured signal included into a second time interval, subsequent to the first time interval; perform a discrete derivative of the first plurality of samples obtaining past derivative samples; perform a discrete derivative of the second plurality of samples obtaining present derivative samples; compute a derivative similarity index by processing the past derivative samples and the present derivative samples according to an auto-correlation type function; the derivative similarity index quantifying the similarity of the past derivative samples with the present derivative samples; compare the derivative similarity index with a threshold value to obtain a comparison result; and detect an arc-fault condition in the electrical circuit basing on the comparison result.

In an embodiment, the computing device is configured to: define a computing cycle depending on the measured signal; iteratively compute the similarity index at every computing cycle, compute the threshold value as an adaptive threshold calculated at every computing cycle by applying a low-pass filter to at least one derivative similarity index already computed.

In an embodiment, the computing device is configured to compute the adaptive threshold at a present time as a function of a past adaptive threshold computed at a past time and the similarity index computed at the present time.

In an embodiment, the computing device is configured to: compute the adaptive threshold at a present time as an average of past values assumed by the similarity index.

In an embodiment, the computing device is configured to select a fixed threshold value and compare the derivative similarity index with the fixed threshold value.

In an embodiment, the computing device is configured to: compare the derivative similarity index with a product of the threshold value with a factor; wherein the factor is obtained by one of the following methods: choosing a fixed value of the factor; computing the factor by dividing a present threshold value by a quantity comprising the sum of the present threshold value and a standard deviation of previously computed derivative similarity indexes.

In an embodiment, the computing device is configured so that: each sample of the first plurality of samples is an average of a plurality of samples of the measured signal on a corresponding computing past interval; the first time interval being formed by a plurality of computing past intervals.

In an embodiment, the electrical current flowing in the electrical circuit is one of the following current types: an Alternate Current associated to a current cycle; a Direct Current, an electrical current of a phase of a three-phase system.

In an embodiment, the first and second time intervals are consecutive cycles of the electrical current.

In an embodiment, the computing device is configured so as that: the past derivative samples and the present derivative samples have a same number of samples; the auto-correlation type function computes a summation of the products of a plurality of first factors and a plurality of second factors; wherein: the plurality of first factors and the plurality of second factors includes a respective number of factors equal to the number of samples; each first factor is a first difference between a past derivative sample and a first average value associated with the past derivative samples; each second factor is a second difference between a present derivative sample and a second average value associated with the present derivative samples.

In an embodiment, the computing device is configured to: compute a first standard deviation of the past derivative sample and compute a second standard deviation of the present derivative sample.

In an embodiment, the computing device is configured to: compute the derivative similarity index according one of the following computing methods: the derivative similarity index is the summation of products; the derivative similarity index is obtained by dividing the summation of products by a product of the first and second standard deviations.

According to a second aspect, the present disclosure relates to an electrical installation comprising an electrical circuit comprising electrical conductors and electrical loads; an arc-fault detection apparatus connected to the electrical circuit. The arc-fault detection apparatus comprises an electrical current measuring device configured to provide a measured signal representing an electrical current flowing in the electrical circuit and a computing device configured to: acquire a first plurality of samples from the measured signal included into a first time interval; acquire a second plurality of sample from the measured signal included into a second time interval, subsequent to the first time interval; perform a discrete derivative of the first plurality of samples obtaining past derivative samples; perform a discrete derivative of the second plurality of samples obtaining present derivative samples; compute a derivative similarity index by processing the past derivative samples and the present derivative samples according to an auto-correlation type function; the derivative similarity index quantifying the similarity of the past derivative samples with the present derivative samples; compare the derivative similarity index with a threshold value to obtain a comparison result; detect an arc-fault condition in the electrical circuit basing on the comparison result.

According to a third aspect, the present disclosure relates to an arc-fault detection method comprising: providing by an electrical current measuring device connectable to an electrical circuit a measured signal representing an electrical current flowing in the electrical circuit; acquiring a first plurality of samples from the measured signal included into a first time interval; acquiring a second plurality of samples from the measured signal included into a second time interval, subsequent to the first time interval; performing a discrete derivative of the first plurality of samples obtaining past derivative samples; performing a discrete derivative of the second plurality of samples obtaining present derivative samples; computing a derivative similarity index by processing the past derivative samples and the present derivative samples according to an auto-correlation type function; the derivative similarity index quantifying the similarity of past derivative samples to the present derivative samples; comparing the derivative similarity index with a threshold value to obtain a comparison result; and detect an arc-fault condition in the electrical circuit basing on the comparison result.

In an embodiment, the method further includes: defining a computing cycle depending on the measured signal; iteratively computing the similarity index at every computing cycle; computing the threshold value as an adaptive threshold calculated at every computing cycle by applying a low-pass filter to at least one derivative similarity index already computed.

BRIEF DESCRIPTION OF THE DRAWINGS

Further characteristics and advantages will be more apparent from the following description of the various embodiments given as a way of an example with reference to the enclosed drawings in which.

DETAILED DESCRIPTION OF ILLUSTRATIVE EMBODIMENTS

Figure 1:
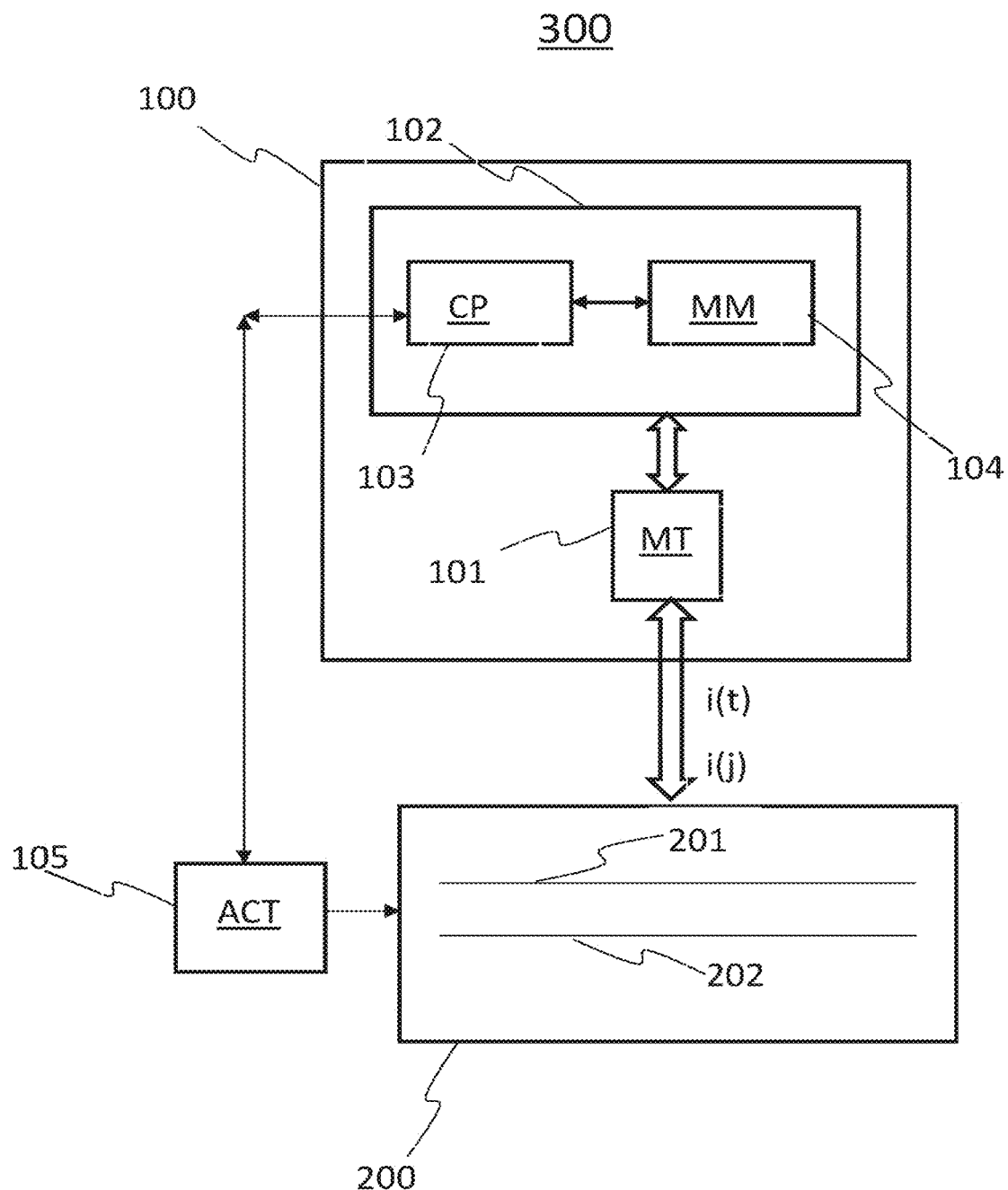
FIG. 1 schematically shows an embodiment of an electrical installation comprising an arc-fault detection apparatus connected to an electrical circuit.

FIG. 1 schematically shows an electrical installation 300 comprising an arc-fault detection apparatus 100 connected to an electrical circuit 200.

The electrical circuit 200 can be an AC electrical wiring (as an example, a house wiring or an industrial wiring) and includes: at least one first electrical conductor 201 (such as an example, a phase conductor), electrical loads (not shown) and, as an example, a second conductor 202 (such as a neutral conductor). According to another embodiment, the electrical circuit 200 is a Direct Current electrical wiring, such as an example, that employed in photovoltaic plants. The electrical circuit 200 can be potentially subjected to arc-faults generated in its components (conductors, cables or other electrical loads).

The arc-fault detection apparatus 100 comprises an electrical current measuring device 101 (MT) and a detection device 102 which includes a computing device 103 (CP) and a memory 104 (MM). The computing device 103 may be a microcontroller. As known to a person skilled in the aft, a computing device 103 may include a processor, a non-volatile memory storing instructions so that the computing device 103 may be programmed.

The computing device 103 is configured to perform processing operations on the signals provided to its input, so as to detect the presence or absence of an arc-fault in the electrical circuit 200.

Particularly, the computing device 103 can be also configured to command activation or non-activation of an actuator 105 (ACT) as a function of those processing operations. The actuator 105 is suitable for interrupting (for example by opening switches, not shown) or allowing the circulation of the current in the electrical circuit 200.

The memory 104 of the detection device 102 is configured to store values of various parameters and software instructions defining functions and steps outlined below and implemented by the detection device 102, when the software instructions are executed by the computing device 103.

The measuring device 101 can include a shunt, a current meter based on a transformer or another type of device configured to provide a measured electrical signal (a current signal or a voltage signal) representing the intensity of the current circulating in the electrical circuit 200. The measuring device 101 can provide an analogical electrical signal or digital samples corresponding to said measured electrical signal. If the measuring device 101 provides an analogical electrical signal, the computing device 103 can be configured to sampling the analogical electrical signal to obtain digital values, hereinafter called "samples".

Figure 2:
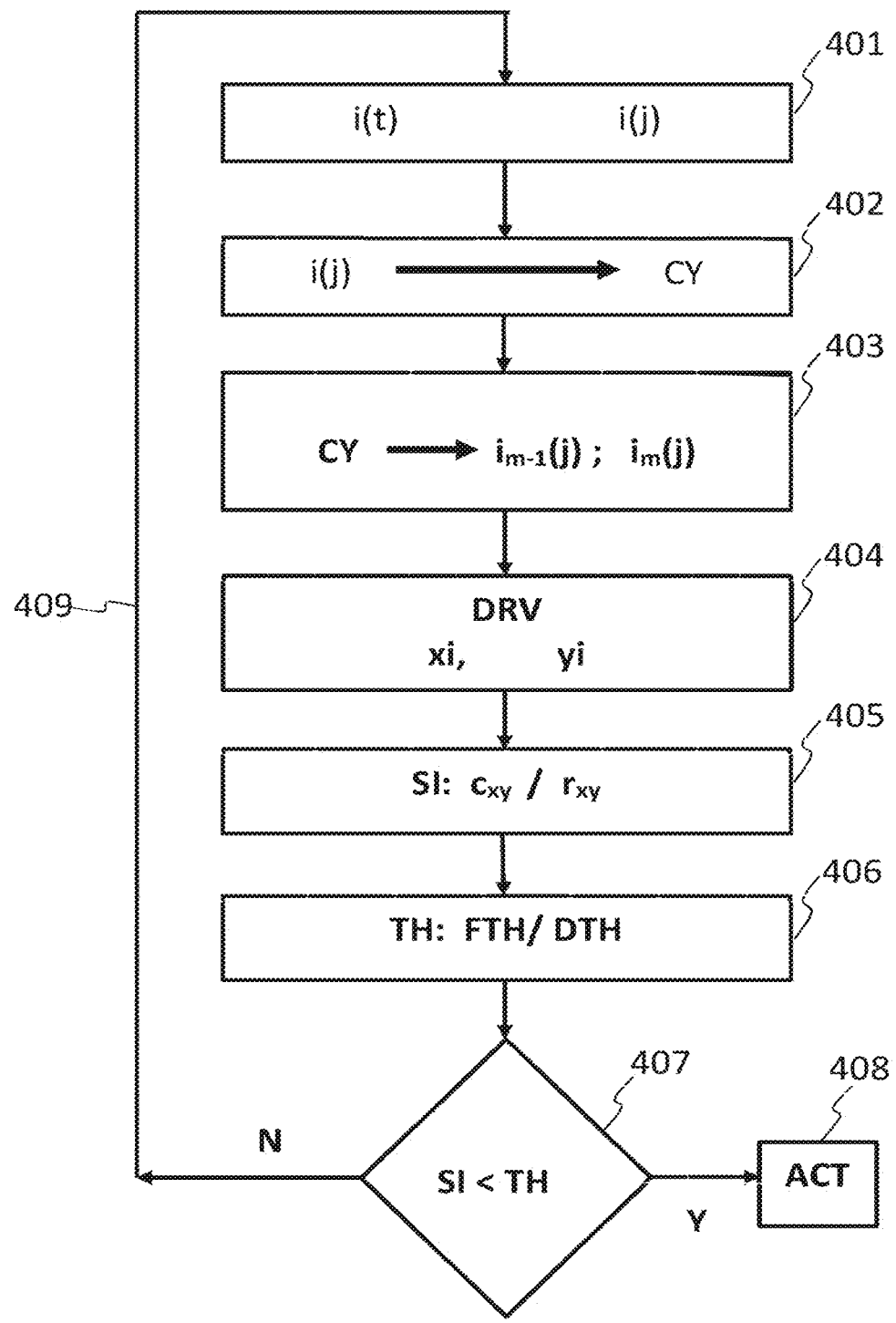
FIG. 2 is a flow diagram of an embodiment of an arc-fault detection method implantable by the arc-fault detection apparatus.

FIG. 2 is a flow diagram of an embodiment of an arc-fault detection method 400 implantable by the arc-fault detection apparatus 100 above described. As it will be clear from the following description, the arc-fault detection method 400 is a time-domain method.

The arc fault detection method 400 comprises a measurement step 401 in which the measuring device 101 provides the measured electrical signal i(t), corresponding to the intensity of the current circulating in the electrical circuit 200. In accordance with an example, the measuring device 101 provides a plurality of samples i(j) corresponding to a digital version of the measured electrical signal i(t).

Particularly, the arc fault detection method 400 further includes a segmentation step 402 in which, as an example, a computing cycle CY is determined. The computing cycle CY defines the repetition cycle of the arc fault detection method 400.

If the electrical current i(t) is Alternate Current the computing cycle is the period of the AC current. The computing cycle CY can be determined from the digital samples i(j) by detecting two zero-crossing events, one at the beginning of the cycle the other at the end of the cycle, and counting the number of samples included between the two events.

If the electrical current i(t) is a Direct Current the computing cycle CY is a conventional time interval.

Moreover, the arc fault detection method 400 comprises an acquiring step 403, wherein the computing device 103 acquires (i.e. it receives from the measuring device 101 or it performs an A/D conversion) a first plurality of samples $i_{m-1}(j)$ of said measured signal samples i(j) occurred in a past time interval m−1, preferably included into the computing cycle CY.

The computing device 103 also acquires a second plurality of samples $i_m(j)$ of said measured signal samples i(j), preferably included into the computing cycle CY, and occurred at a present (i.e. current) time interval m, subsequent to the past interval m−1. The present interval can be exactly consecutive to the past interval or it can be time spaced from it by one or more intermediate cycles.

Alternatively, instead of using the past interval m−1, an average of the measured signal samples in a plurality of past intervals can be used. Particularly, the average can be done on a plurality of past intervals ranging from 10 to about 50. The following formula can be used to compute the average past samples $i_a(j)$ on the averaged past intervals:

$$i_a(j) = \frac{1}{p}\sum_{n=1}^{p} i_{m-n}(j) \qquad (A)$$

where ia(j) is the j-th sample of the averaged interval, p is the number of past intervals considered, im−n(j) is the j-th sample of the m−n past interval. In this case, the samples im−n(j) used in formula (A) belong to a time interval that does not necessarily coincide with a single computing cycle CY but can be a multiple of said cycle.

Furthermore, a derivative step 404 (DRV) is performed. Particularly, the computing device 103 computes a discrete derivative of the second plurality of samples $i_m(j)$, so obtaining present derivative samples $x_i$. The discrete derivative of the second plurality of sample $i_{m-1}(j)$ can be computed by the backward difference formula:

$$x_i = i_m(i) - i_m(i-1) \qquad (1)$$

According to formula (1), the derivative is computed as difference between a present sample and a past sample.

Analogously (i.e. by using the backward difference formula), the computing device 103 computes a discrete derivative of the first plurality of samples $i_{m-1}(j)$ obtaining past derivative samples $y_i$. Alternatively, the past derivative samples $y_i$ can be computed applying the backward difference formula to the average past samples $i_a(j)$ of formula (A). According to another embodiment, the past derivative samples $y_i$ computed applying the backward difference formula to the average past samples $i_a(j)$ of formula (A) are replaced by the average of the past derivative samples $y_i$ computed on the same plurality of past intervals.

In a similarity evaluation step 405, the computing device 103 computes a derivative similarity index SI by processing the past derivative samples $y_i$ and the present derivative samples $x_i$ according to an auto-correlation type function. The derivative similarity index SI quantifies the similarity of the past derivative samples $y_i$ to the present derivative samples $x_i$.

Particularly, the auto-correlation type function is similar to an auto-correlation calculated with a fixed time shift parameter equal, as an example, to one cycle. More particularly, the auto-correlation type function computes a summation of the products of a plurality of first factors and a plurality of second factors. The plurality of first factors and the plurality of second factors include a respective number of factors equal to the number of samples. Each first factor is a first difference, $(x_i-\bar{x})$, between a past derivative samples and a first average value associated with the past derivative samples. Each second factor is a second difference, $(y_i-\bar{y})$, between a past derivative samples and a second average value associated with the current derivative samples.

In accordance with the above description, the derivative similarity index SI is computed, particularly, by the following formula, which provides a first derivative similarity index $c_{xy}$:

$$c_{xy} = \Sigma_{i=0}^{n-1}(x_i-\bar{x})(y_i-\bar{y}) \quad (2)$$

Where $x_i$ and $y_i$ are respectively the present and past derivative samples (as defined above); $\bar{x}$ and $\bar{y}$ are respectively the average of $x_i$ and $y_i$ samples over their respective cycles. Finally, n is the number of samples in each computing cycle CY.

From an analytical point of view, the calculation of equation (2) is similar to the Pearson correlation coefficient. Since this operation of equation (2) is linear, its computational complexity is of order o(n).

As an alternative to the first derivative similarity index $c_{xy}$ of formula (2) the derivative similarity index SI can be computed as normalized auto-correlation so as to obtain a second derivative similarity index $r_{xy}$. The second derivative similarity index $r_{xy}$ can be computed by dividing the first similarity index $r_{xy}$ of formula (2) by a product of a standard deviations $\sigma_x$ of the present derivative samples $x_i$ and a standard deviation $\sigma_y$ of the past derivative samples $y_i$. Accordingly, the second derivative similarity index $r_{xy}$ is given by the following formula:

$$r_{xy} = \frac{c_{xy}}{\sigma_x \sigma_y} \quad (3)$$

The second derivative similarity index $r_{xy}$ assumes the value 1 if the two or more samples of the compared cycles ($x_i$ and $y_i$) are identical in shape (independently from their respective scales). If the samples differ in some (even small) features, the second derivative similarity index $r_{xy}$ will be lower than 1.

It is observed that on a practical implementation, when the second derivative similarity index $r_{xy}$ is used, the previous equation (3) is equivalent to the Pearson correlation coefficient formula, considering the samples from the current derivative cycle at a given sample ($x_i$) and the samples from the previous cycle ($y_i$):

$$r_{xy} = \frac{\sum_{i=1}^{n}(x_i-\bar{x})(y_i-\bar{y})}{\sqrt{\sum_{i=1}^{n}(x_i-\bar{x})^2}\sqrt{\sum_{i=1}^{n}(y_i-\bar{y})^2}} \quad (4)$$

In the above formula, n is the number of samples in a computing cycle CY, as previously defined. As an example, for a 50 Hz current, sampled at 10 kHz, each cycle (and also the current derivative cycle) will contain 200 samples. Sampling the current at 1 kHz (that is adequate for most applications), a computing cycle will only contain 20 samples.

Method 400 also includes a threshold definition step 406 wherein a threshold TH is chosen. The threshold TH can be a fixed value FTH or an adaptive dynamic threshold DTH. When a fixed threshold FTH is used, its value can be derived from a preliminary statistical analysis of similar situations, to obtain an optimal value. In this case, preferably the second derivative similarity index $r_{xy}$ is used, in order to be insensitive from the signal amplitude.

Some embodiments of methods for defining the dynamic threshold DTH will be described subsequently.

Still with reference to FIG. 2, method 400 further comprises a comparison step 407 in which a computed similarity index SI (i.e. the first similarity index $c_{xy}$ or the second similarity index $r_{xy}$) is compared with the threshold TH.

If the computed similarity index SI is lower than the threshold TH, it means that an electrical arc is most probably present in the electrical circuit 200, since the signals corresponding to the samples $x_i$ and $y_i$ are significantly different each other. In this case, advantageously, the computing device 103 generates an alarm and, particularly, also a command signal to instruct the actuator 105 to interrupt electrical current flowing in the electrical circuit 200 (action step 408, branch Y).

It is noticed that, in order to have a more reliable detection, the alarm condition can be raised after a number of subsequent checks, typically ranging from 2 to 10 cycles. This approach is particularly reliable since reduces false positive detections.

If the computed similarity index SI is equal or higher than the threshold TH, it means that the electrical circuit 200 is operating in normal conditions and no arc-fault is detected. In this case the method 400 repeats the above described steps considering a subsequent present cycle (branch 409 (N)). Particularly, method 400 is repeated at any computing cycle CY.

With reference to the adaptative threshold DTH, it is observed that when such adaptative threshold is employed the first derivative similarity index $c_{xy}$ is preferably to be used.

Figure 3:
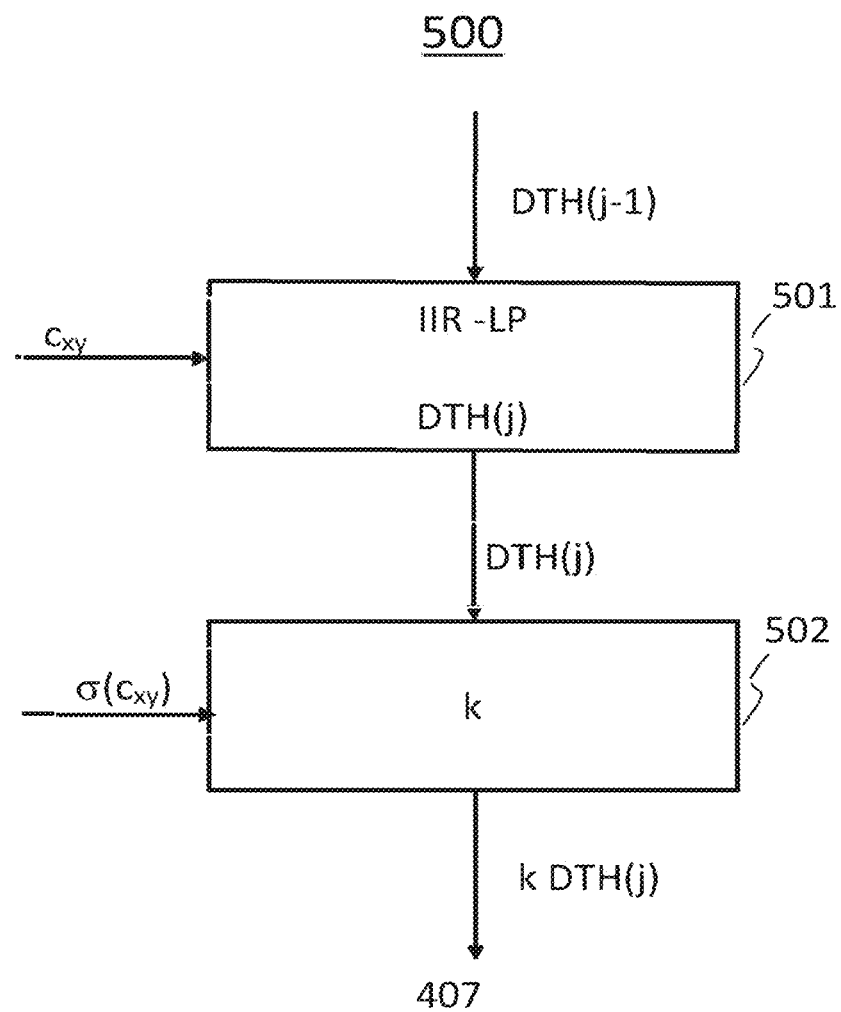
FIG. 3 is flow diagram of a particular method for calculating an adaptative threshold.

FIG. 3 schematically shows a flow diagram of a particular method 500 of calculating the adaptative threshold DTH.

The adaptative threshold DTH is obtained by applying a low-pass filter to first derivative similarity indexes $c_{xy}$ obtained at each iteration. Particularly, the adaptative threshold DTH is iteratively calculated at any computing cycle CY by considering at least one value of the first derivative similarity index $c_{xy}$ and/or at least one previous value of the adaptative threshold DTH.

As represented in FIG. 3, by a calculation step 501, the low pass filter can be implemented as a first order IIR (Infinite Impulse Response) low-pass filter defined, as an example, by the following equation:

$$DTH(j) = a\,DTH(j-1) + (1-a)c_{xy}(j) \quad (5)$$

Equation (5) expresses that the value of the adaptative threshold DTH at in sample instant j is given by the summation of a first addend and a second addend. The first addend depends on the value of the adaptative threshold DTH at a previous sample instant (j−1), according to a coefficient "a". The coefficient "a" can be chosen within the interval 0.5-0.99, preferably it is comprised between 0.7 and 0.99. The second addend depends on the product of the present value of first derivative similarity indexes $c_{xy}$ and the complementary to 1 of coefficient a.

Alternatively, the low-pass filter can be implemented by an average function acting on previous values of the first derivative similarity indexes $c_{xy}$. In this case, the present value of the adaptative threshold DTH can be obtained by performing the average of the first derivative similarity indexes $c_{xy}$ calculated on 10 to 100 previous cycles.

As described with reference to the comparison step 407 of FIG. 2, the first derivative similarity indexes $c_{xy}$ is compared with the adaptive threshold DTH. According to another embodiment, the first derivative similarity indexes $c_{xy}$ is compared with the product of the adaptive threshold DTH and factor k:

$$c_{xy}(j) < k \, \text{DTH}(j) \quad (6)$$

The factor k can be a fixed value, particularly comprised between 0.8 and 0.5, but in a preferred embodiment it can be evaluated dynamically. According to an example the factor k is evaluated as indicated by the following formula:

$$k = \text{DTH}(j)/(f\text{DTH}(j) + \sigma(c_{xy})) \quad (7)$$

where $\sigma(c_{xy})$ is the standard deviation of the first derivative similarity indexes $c_{xy}$ evaluated over a certain number of past cycles, preferably ranging from 10 to 100, DTH(j) is the current value of adaptive threshold DTH and "f" is a factor preferably ranging from 2 to 3. In FIG. 3 is exemplary represented a factor k calculation step 502.

According to equation (6), an arc-fault is detected when the first derivative similarity indexes $c_{xy}$ is k times lower than DTK(j).

Finally, it can be noted that the above-described dynamic threshold DTH, also applies when the second derivative similarity index $r_{xy}$ is used: the same equations above described can be employed.

It has to be noted that, since some of the above described quantities requires a certain time to reach a steady state after initialization (in particular the low-pass filter, the average, the standard deviation, etc), usually the alarm is inhibited during this time to avoid undesired behaviours. Optionally, a similar action is also taken when a stepwise variation in the current signal is detected, meaning that a new load has been connected or disconnected.

While waiting for steady state condition, the alarm can be briefly inhibited and/or the calculations of the dynamic threshold parameters (e.g. low-pass filter, average and standard deviation) can be reset to the current cycle data.

As already indicated the method described with reference to FIGS. 2 and 3 can also be applied to DC current.

It is also noticed that the method described with reference to FIGS. 2 and 3 can be applied to electrical circuits 200 of the three-phase type. In case, methods 400 and 500 are applied independently to each electrical current of the three-phase circuit.

Experimental Tests

The Applicant has performed experimental tests applying the above described method. Particularly, the second derivative similarity index $r_{xy}$ has been used together with fixed thresholds FTH.

The tests have been performed in accordance with the standard UL1699, employing an arc fault simulator and different electrical loads. The current signals of each load was sampled at a frequency of 10 kHz, and the on and off states of the arc were chosen at random. To serve as a reference, a second signal reflecting the status of the arc's activation was synchronously sampled.

Figure 4:
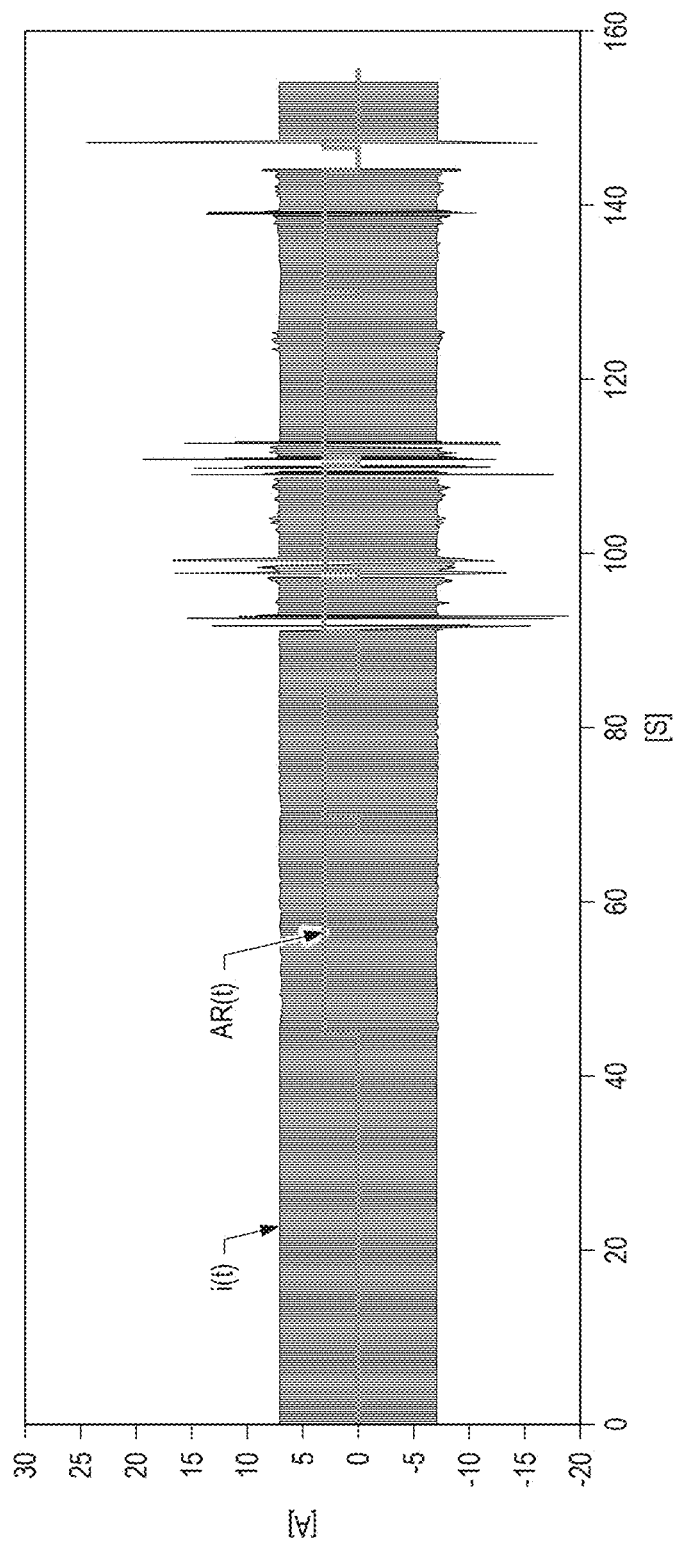
FIG. 4 refers to an experimental test and shows a current signal of a purely resistive load superimposed with a signal indicating the state of an electrical arc.

FIG. 4 shows the current signal i(t) of a purely resistive load superimposed with the signal indicating the state of the arc AR(t). For the arc presence, low value corresponds to arc absence and high value corresponds to arc presence.

Figure 5B:
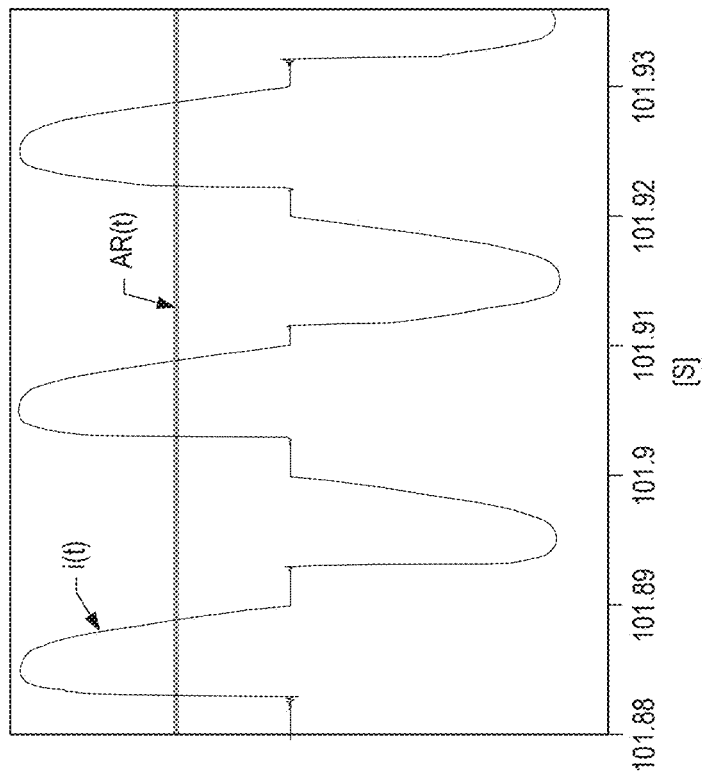
FIGS. 5A and 5B show a zoom of FIG. 4: in absence of arc (FIG. 5A) and in presence of arc (FIG. 5B)
Figure 5A:
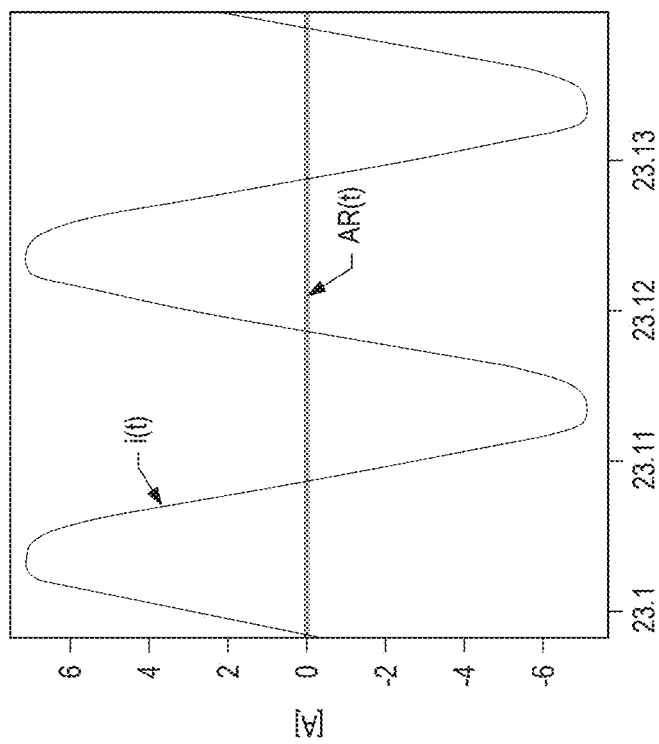

The following FIGS. 5A and 5B show a zoom of the previous figure where the arc was off (5A) and on (5B) respectively. As it can be seen, the current is sinusoidal, as expected by a resistive load, and the distortions caused by the arc are quite small, but still visible (mainly near the zero crossings and at the top of the waveforms).

Figure 6:
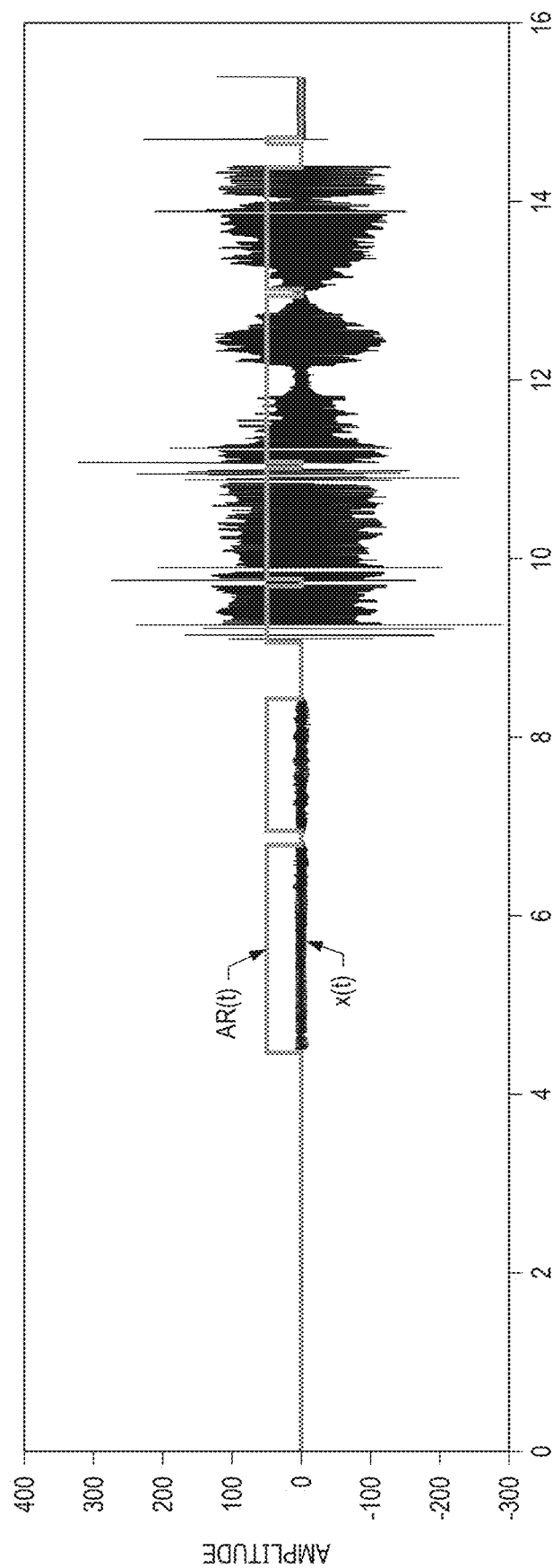
FIG. 6 shows a waveform of the derivative of the current signal of FIG. 4 together with the arc trend.
Figure 7:
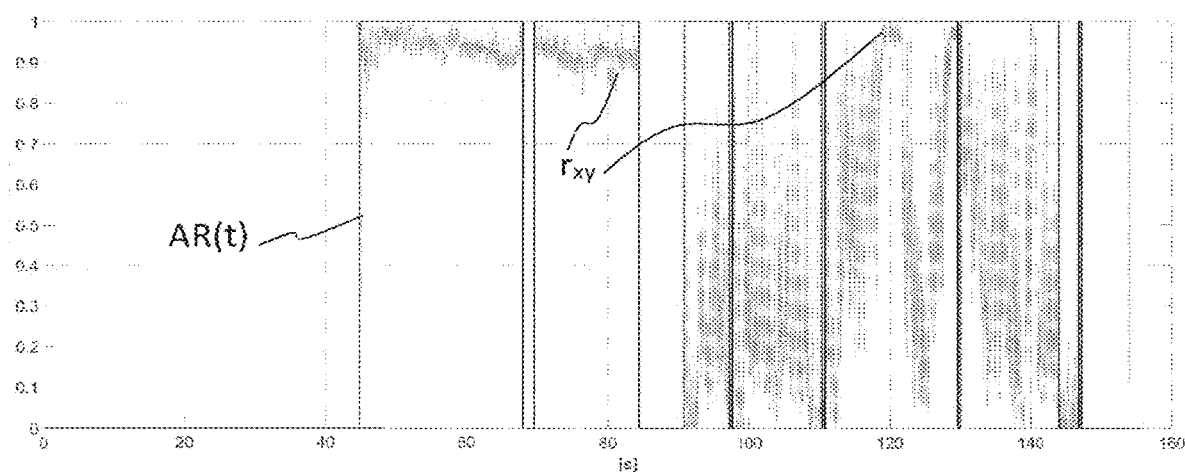
FIG. 7 shows a normalized auto-correlation signal computed from the waveform of FIG. 6.

FIG. 6 shows the complete waveform of the derivative x(t) of the current signal of FIG. 4 which "amplify" the arc features. The normalized auto-correlation signal $r_{xy}$ is shown in FIG. 7, together with the signal indicating the state of the arc AR(t).

As it can be observed, the auto-correlation $r_{xy}$ is 1 when the arc is not present, but when the arc is activated, the cross-correlation decreases its value. It is possible to observe that the change in value is quite immediate, so the arc detection is fast.

In this case, setting a threshold value of 0.95, very good and reliable detection is achieved.

This has been investigated by statistically comparing various threshold values across several acquisitions.

Figure 8:
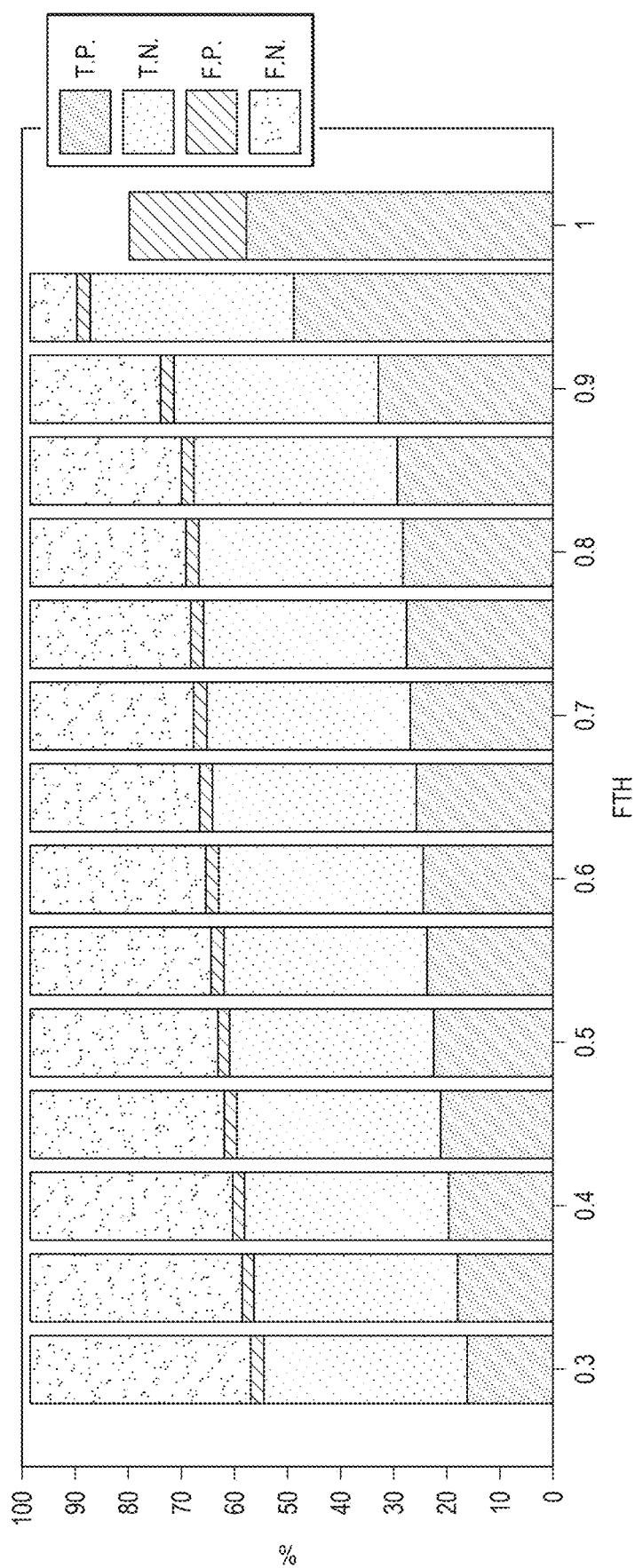
FIG. 8 shows by a histogram plot the amounts of correct outputs and false outputs.

FIG. 8 shows by a histogram plot the amounts (in %) of: true positive detections (T.P.), true negative detections (T.N.) corresponding to correct output, false positive detection (F.P.) and false negative (F.N.) detection corresponding to erroneous output depending on the threshold value TH. In FIG. 8, the best value (minimizing false positives and false negatives) is obtained for a threshold value of 0.95. In this case around the 90% of detections are correct. This is a very good value (due to the stochastic nature of the phenomenon, a 100% correct output cannot be obtained by whatever method).

Figure 9B:
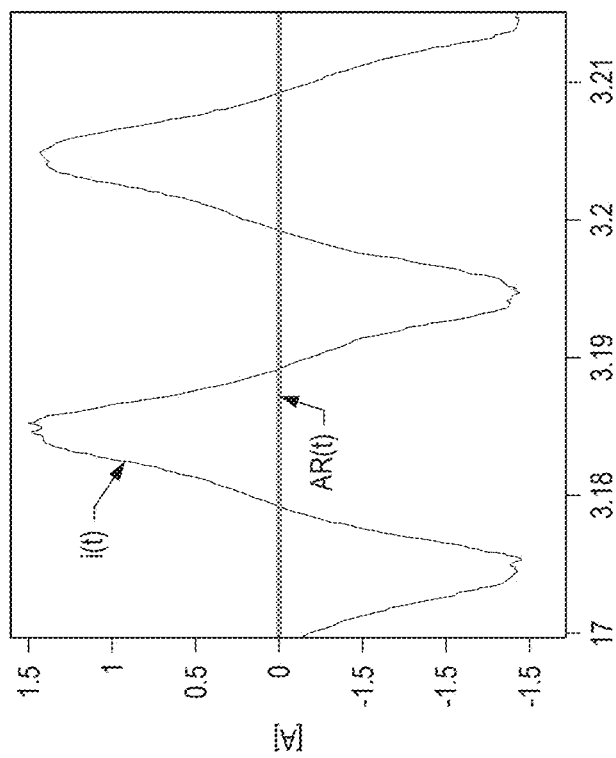
FIG. 9A shows a sinusoidal waveform of an electrical current and FIG. 9B shows the behavior of an electrical current generated by a drill.
Figure 9A:
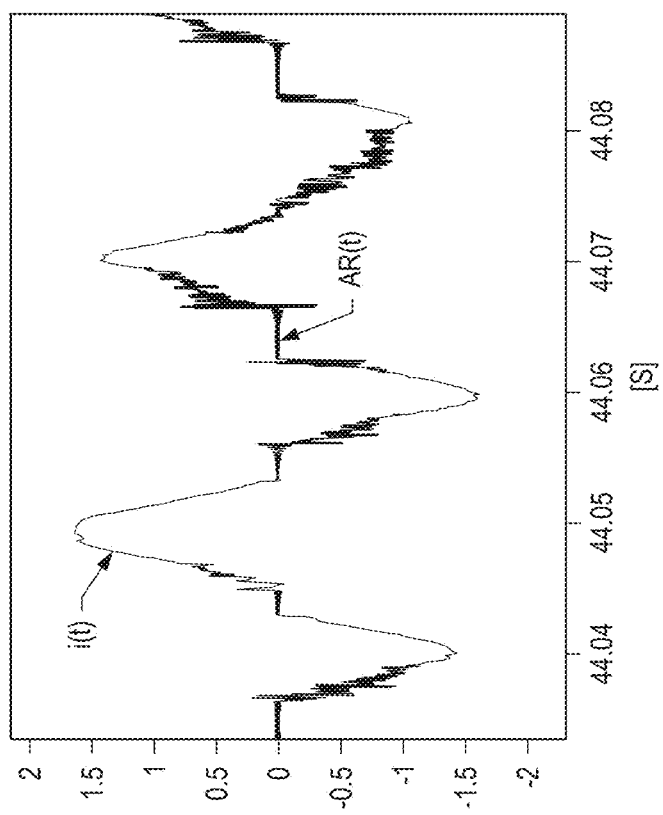

Moreover, the performances of the method have been tests in a difficult scenario such as in the case when the arc occurs during operation of drill. As a result of the drill's inherent workings, the current waveform in this case is no longer a sinusoidal signal (FIG. 9A) and exhibits some randomness even without the presence of the arc, as it can be noticed from FIG. 9B. It is noticed that the drill and other motor-powered devices belong to "masking loads" category because they mimic the behaviour of an arc and can thus simulate or cover it up.

Figure 10:
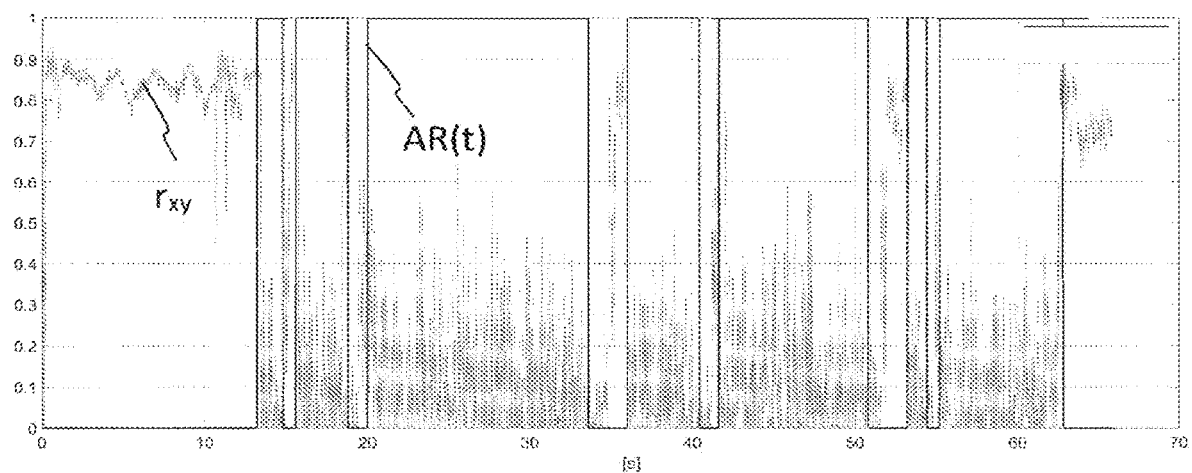
FIG. 10 shows a normalized auto-correlation and an arc signal for the situation of drill type waveform.

FIG. 10 shows (employing symbols analogous to that of FIG. 8) the computed normalized auto-correlation $r_{xy}$ and the arc signal for the situation of drill type waveform. As can be noticed from FIG. 10, method 400 in this challenging situation offers a highly effective indication of the arc's presence. The primary distinction in this scenario is that the cross-correlation parameter is not 1, but slightly lower, when the arc is off. This suggests that the threshold value has to be lower.

Figure 11:
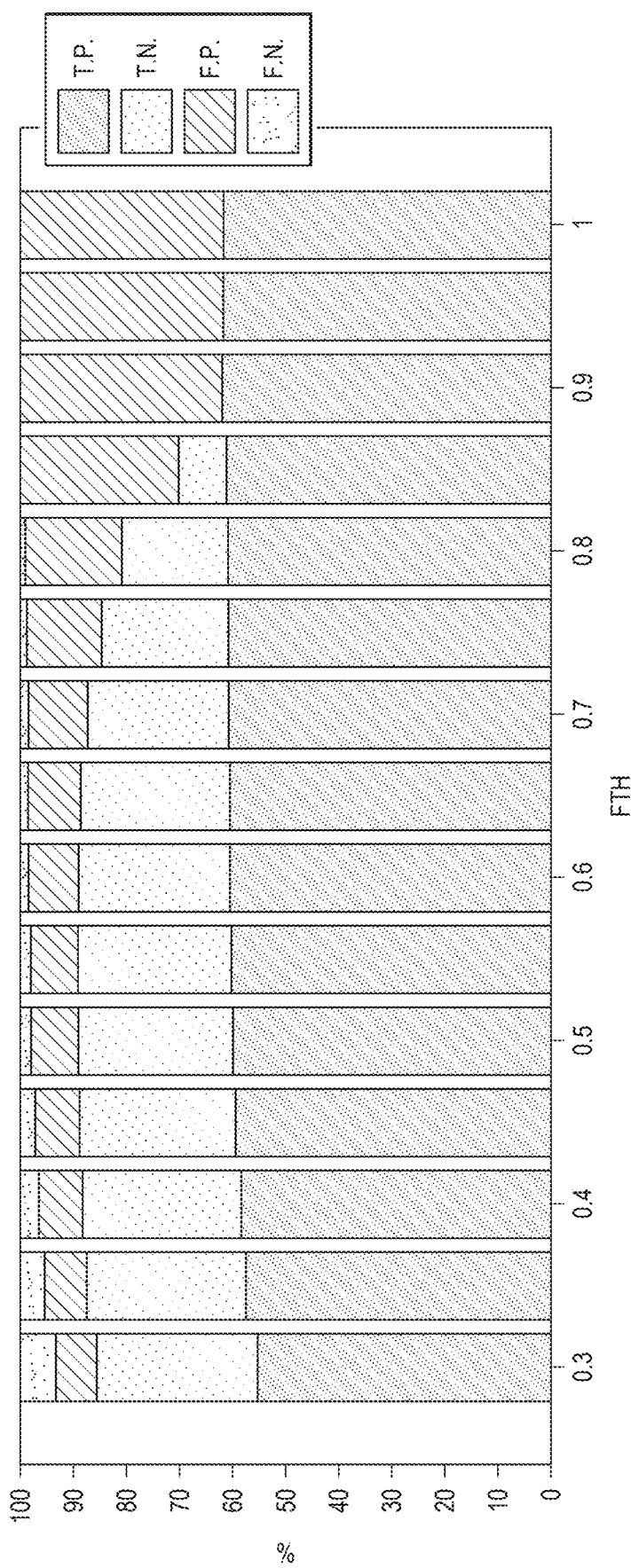
FIG. 11 shows a statistical analysis of correct detections and false detections for different threshold values, with reference to the drill type waveform.

FIG. 11 shows a statistical analysis of correct detection and false detection for different threshold values. The ideal threshold is somewhere around 0.50, or a little bit higher if some false positives can be accepted. Given that this is a masked load, the reliability in this instance is between 85 and 87 percent, which is extremely impressive.

The above described apparatus and methods show relevant advantages over prior art techniques. Due to its low computational cost, it allows implementing an arc-fault detections on low-cost hardware or as a secondary function of an unrelated monitoring or protection device. Particularly, the non-normalized cross-correlation formula is very computationally efficient.

It is important to observe that the non-complexity of the algorithm also offers a very low latency, compared to other time domain algorithms.

Moreover, notwithstanding its non-complexity the described time domain method achieves a high level of accuracy and an adjustable latency (the trade-off between latency and accuracy can be tuned).

Furthermore, the particular use of the adaptive threshold DTH has the advantages of avoiding previous knowledge or study of electrical loads included into circuit 200, since said threshold is automatically calculated by the apparatus 100. The adaptive threshold DTH allows easily handling of noisy, masking or changing electrical loads.

What is claimed is:

1. An arc-fault detection apparatus comprising:
an electrical current measuring device connectable to an electrical circuit and configured to provide a measured signal representing an electrical current flowing in the electrical circuit;
a computing device comprising a processor and a non-transitory memory storing instructions that when executed by the processor cause the computing device to:
acquire a first plurality of samples from the measured signal included in a first time interval;
acquire a second plurality of samples from the measured signal included in a second time interval, subsequent to the first time interval;
perform a discrete derivative of the first plurality of samples obtaining past derivative samples;
perform a discrete derivative of the second plurality of samples obtaining present derivative samples;
compute a derivative similarity index by processing the past derivative samples and the present derivative samples according to an auto-correlation type function; the derivative similarity index quantifying a similarity of the past derivative samples with the present derivative samples;
compare the derivative similarity index with a threshold value to obtain a comparison result; and
detect an arc-fault condition in the electrical circuit based on the comparison result.

2. The apparatus of claim 1, wherein the computing device comprises further instructions that when executed by the processor cause the computing device to:
define a computing cycle depending on the measured signal;
iteratively compute the similarity index at every computing cycle; and
compute the threshold value as an adaptive threshold calculated at every computing cycle by applying a low-pass filter to at least one derivative similarity index already computed.

3. The apparatus of claim 2, wherein the computing device comprises further instructions that when executed by the processor cause the computing device to:
compute the adaptive threshold at a present time as a function of a past adaptive threshold computed at a past time and the similarity index computed at the present time.

4. The apparatus of claim 2, wherein the computing device comprises further instructions that when executed by the processor cause the computing device to:
compute the adaptive threshold at a present time as an average of past values assumed by the similarity index.

5. The apparatus of claim 1, wherein the computing device comprises further instructions that when executed by the processor cause the computing device to:
select a fixed threshold value; and
compare the derivative similarity index with the fixed threshold value.

6. The apparatus of claim 1, wherein the computing device comprises further instructions that when executed by the processor cause the computing device to:
compare the derivative similarity index with a product of the threshold value with a factor, wherein the factor is obtained by:
choosing a fixed value of the factor; or
computing the factor by dividing a present threshold value by a quantity comprising the sum of the present threshold value and a standard deviation of previously computed derivative similarity indexes.

7. The apparatus of claim 1, wherein the computing device is configured so that: each sample of the first plurality of samples is an average of a plurality of samples of the measured signal on a corresponding computing past interval, the first time interval being formed by a plurality of computing past intervals.

8. The apparatus of claim 1, wherein:
the electrical current flowing in the electrical circuit is:
an alternate current associated to a current cycle;
a direct current; or
an electrical current of a phase of a three-phase system.

9. The apparatus of claim 1, wherein:
the first and second time intervals are consecutive cycles of the electrical current.

10. The apparatus of claim 1, wherein the computing device comprises further instructions that when executed by the processor cause the computing device to operate so that:
the past derivative samples and the present derivative samples have a same number of samples; and
the auto-correlation type function computes a summation of products of a plurality of first factors and a plurality of second factors;
wherein:
the plurality of first factors and the plurality of second factors include a respective number of factors equal to the number of samples;
each first factor is a first difference between a past derivative sample and a first average value associated with the past derivative samples; and
each second factor is a second difference between a present derivative sample and a second average value associated with the present derivative samples.

11. The apparatus of claim 10, wherein the computing device comprises further instructions that when executed by the processor cause the computing device to:
compute a first standard deviation of the past derivative sample; and
compute a second standard deviation of the present derivative sample.

12. The apparatus of claim 11, wherein the computing device comprises further instructions that when executed by the processor cause the computing device to:
compute the derivative similarity index according to one of the following computing methods:
the derivative similarity index is the summation of products; and
the derivative similarity index is obtained by dividing the summation of products by a product of the first and second standard deviations.

13. An electrical installation comprising:
an electrical circuit comprising electrical conductors and electrical loads;
an arc-fault detection apparatus coupled to the electrical circuit and comprising:

an electrical current measuring device, the electrical current measuring device being configured to provide a measured signal representing an electrical current flowing in the electrical circuit;

a computing device comprising a processor and a non-transitory memory storing instructions that when executed by the processor cause the computing device to:

acquire a first plurality of samples from the measured signal included in a first time interval;

acquire a second plurality of samples from the measured signal included in a second time interval, subsequent to the first time interval;

perform a discrete derivative of the first plurality of samples obtaining past derivative samples;

perform a discrete derivative of the second plurality of samples obtaining present derivative samples;

compute a derivative similarity index by processing the past derivative samples and the present derivative samples according to an auto-correlation type function; the derivative similarity index quantifying a similarity of the past derivative samples with the present derivative samples;

compare the derivative similarity index with a threshold value to obtain a comparison result; and detecting an arc-fault condition in the electrical circuit based on the comparison result.

14. The electrical installation of claim 13, wherein the computing device comprises further instructions that when executed by the processor cause the computing device to:

define a computing cycle depending on the measured signal;

iteratively compute the similarity index at every computing cycle; and compute the threshold value as an adaptive threshold calculated at every computing cycle by applying a low-pass filter to at least one derivative similarity index already computed.

15. The electrical installation of claim 14, wherein the computing device comprises further instructions that when executed by the processor cause the computing device to:

compute the adaptive threshold at a present time as a function of a past adaptive threshold computed at a past time and the similarity index computed at the present time.

16. The electrical installation of claim 14, wherein the computing device comprises further instructions that when executed by the processor cause the computing device to:

compute the adaptive threshold at a present time as an average of past values assumed by the similarity index.

17. An arc-fault detection method comprising:

providing by an electrical current measuring device connectable to an electrical circuit a measured signal representing an electrical current flowing in the electrical circuit;

acquiring a first plurality of samples from the measured signal included in a first time interval;

acquiring a second plurality of samples from the measured signal included in a second time interval, subsequent to the first time interval;

performing a discrete derivative of the first plurality of samples obtaining past derivative samples;

performing a discrete derivative of the second plurality of samples obtaining present derivative samples;

computing a derivative similarity index by processing the past derivative samples and the present derivative samples according to an auto-correlation type function; the derivative similarity index quantifying a similarity of past derivative samples to the present derivative samples;

comparing the derivative similarity index with a threshold value to obtain a comparison result; and detecting an arc-fault condition in the electrical circuit based on the comparison result.

18. The method of claim 17, further including:

defining a computing cycle depending on the measured signal;

iteratively computing the similarity index at every computing cycle; and computing the threshold value as an adaptive threshold calculated at every computing cycle by applying a low-pass filter to at least one derivative similarity index already computed.

19. The method of claim 18, further comprising:

computing the adaptive threshold at a present time as a function of a past adaptive threshold computed at a past time and the similarity index computed at the present time.

20. The method of claim 18, further comprising:

computing the adaptive threshold at a present time as an average of past values assumed by the similarity index.

* * * * *